United States Patent
Klein et al.

(10) Patent No.: US 7,519,007 B2
(45) Date of Patent: Apr. 14, 2009

(54) METHOD UTILIZING A SINGLE AGENT ON A NON-ORIGIN NODE FOR MEASURING THE ROUNDTRIP RESPONSE TIME OF WEB PAGES WITH EMBEDDED HTML FRAMES OVER A PUBLIC OR PRIVATE NETWORK

(75) Inventors: Paul Fredric Klein, Newbury Park, CA (US); Dennis Taje Yang, West Hills, CA (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 11/096,750

(22) Filed: Apr. 1, 2005

(65) Prior Publication Data

US 2006/0235961 A1    Oct. 19, 2006

(51) Int. Cl.
*H04L 12/26* (2006.01)
(52) U.S. Cl. ........................ 370/252; 709/224
(58) Field of Classification Search ................. 370/252; 709/224
See application file for complete search history.

(56) References Cited

U.S. PATENT DOCUMENTS

| | | | |
|---|---|---|---|
| 5,095,444 A | 3/1992 | Motles | |
| 5,793,768 A | 8/1998 | Keshav | |
| 5,812,528 A | 9/1998 | VanDervort | |
| 6,041,352 A | 3/2000 | Burdick | |
| 6,078,596 A | 6/2000 | Wellbrock | |
| 6,078,956 A | 6/2000 | Bryant et al. | 709/224 |
| 6,263,361 B1 | 7/2001 | Hoyer et al. | |
| 6,349,210 B1 | 2/2002 | Li | |
| 6,411,998 B1 | 6/2002 | Bryant et al. | |
| 6,522,631 B2 | 2/2003 | Rosborough | |
| 6,526,371 B1 | 2/2003 | Klein et al. | |
| 6,584,504 B1 | 6/2003 | Choe | 709/224 |
| 6,626,847 B1 | 9/2003 | Barrick, Jr. et al. | |
| 7,277,938 B2 * | 10/2007 | Duimovich et al. | 709/224 |
| 2002/0052947 A1 | 5/2002 | Duimovich et al. | |
| 2002/0116491 A1 | 8/2002 | Boyd et al. | 709/224 |
| 2003/0131106 A1 | 7/2003 | Kasriel | 709/225 |

(Continued)

FOREIGN PATENT DOCUMENTS

JP    11110312 A    4/1999

(Continued)

*Primary Examiner*—Chi H Pham
*Assistant Examiner*—Albert T Chou
(74) *Attorney, Agent, or Firm*—Patterson & Sheridan, LLP

(57) ABSTRACT

A computer-based method utilizing a single response time monitor, located on a non-origin node of a public or private network, for measuring the total roundtrip response time of a set of requests resulting from an original request having embedded HTML frames. The response time monitor builds a relationship tree for the original request and its embedded HTML frames. For each request from the set of requests resulting from the original request, including requests for the embedded HTML frames, the method uses the response time monitor to detect a start time and end time of each component of the request's roundtrip response time in order to calculate each component's duration. Later, the response time monitor calculates the total roundtrip response time by adding together the duration of all components of the original request and all its additional requests that have the same network address and port number.

18 Claims, 2 Drawing Sheets

U.S. PATENT DOCUMENTS

| | | | |
|---|---|---|---|
| 2003/0233445 A1 * | 12/2003 | Levy et al. | 709/224 |
| 2004/0221034 A1 | 11/2004 | Kausik et al. | 709/224 |
| 2005/0064857 A1 * | 3/2005 | Coppinger et al. | 455/418 |
| 2006/0159025 A1 | 7/2006 | Abdo et al. | |
| 2006/0221851 A1 | 10/2006 | Klein | |
| 2006/0221852 A1 | 10/2006 | Klein | |

FOREIGN PATENT DOCUMENTS

| | | |
|---|---|---|
| JP | 02002215475 A | 1/2001 |
| JP | 02003044372 A | 7/2001 |
| JP | 2002073431 A | 3/2002 |

* cited by examiner

METHOD UTILIZING A SINGLE AGENT ON A NON-ORIGIN NODE FOR MEASURING THE ROUNDTRIP RESPONSE TIME OF WEB PAGES WITH EMBEDDED HTML FRAMES OVER A PUBLIC OR PRIVATE NETWORK

The present invention is related to the co-pending applications entitled: "System and Method For Measuring the Roundtrip Response Time of Network Protocols Utilizing a Single Agent on a Non-Origin Node", Ser. No. 11/096,765, and "System and Method Utilizing a Single Agent on a Non-Origin Node For Measuring the Roundtrip Response Time Over a Public or Private Network With HTTP/HTTPS Network Protocol", Ser. No. 11/097,938, filed concurrently and assigned to the assignee of the present invention and fully incorporated herein by reference.

BACKGROUND OF THE INVENTION

1. Field of the Invention

This invention relates in general to the field of computer networks, and in particular to a method for highly efficient measuring of the roundtrip response time of web pages with embedded HTML frames over a public or private network, utilizing a single, non-origin measurement point for aggregating time of a set of generated requests and responses that result from an original request.

2. Description of Related Art

The Internet is a vast network of heterogeneous computers and subnetworks all communicating together to allow for global exchange of information. The World Wide Web (WWW) is one of the more popular information services on the Internet which uses web browser software to decipher hypertext links to documents and files located on remote computers or content servers to access multimedia information in the form of text, audio, video, graphic, animation, still pictures, etc.

Many hardware and software utilities and applications, such as network performance monitors, have as their core technology a method of measurement that depends on network data as their input. In today's Information Technology (IT) industry, measuring roundtrip response time of application program transactions is a very important task. Traditional IT practice is to measure that portion of a computer's transaction time as it relates to time spent executing in one or more application servers. However, today's IT industry has included in its calculation of response time the time spent in areas other than application servers. Specifically, the time a transaction takes traversing a network from an origin client node to a destination server node is becoming one of the most important and desired measurements. One example of this environment is that of a customer using a web browser on a client node and interacting with a corporate web server node. The network time between these two nodes is one of the most important time components of all. However, the calculation of this time component is missing from nearly every commercial response time measurement available to customers today. Only when this component is added to the overall response time equation one can have the total roundtrip response time of a transaction.

The technique involved in measuring roundtrip response time, as well as the network time between an origin and destination node, requires that measurement software is present on both of these nodes. Software must be present on the origin node to capture the time of the initial request and another software must be present on the destination node to capture the time the initial request arrives. The difference is the time the request spent over the network. The problem with this technique is that it requires software to be installed on the origin node. In the IT industry, the origin node is often a computer operated by either an employee or a customer at the client node. Thus, this computer is typically not in the direct control of the corporate web server node to have measurement software placed upon it. One exemplary corporate web site is a bank site that would want to calculate response time for its customers with personal computers at home, yet the customer at home will not be open to downloading and installing banking time measurement software, named response time monitor, used for this purpose. Clearly, the burden of performance measurement must be on the provider of the web server site and not the customer of that site.

One technique that has been tried by a number of vendors is to use a web-based Java applet piece of the web page and automatically download it to the customer's client node. Because it is automatically downloadable, it takes the burden and responsibility off the customer. Java applets act as very small software agents that can measure response time at a customer's origin node. However, this technique requires web site design changes which are intrusive to the customer from a performance perspective and they tend to break the web application they are intended to monitor. In addition, they require complementary software to be placed on the web server at the other end. One such implementation of this technique can be found in the IBM Tivoli QOS solution as well as in the PathWAI eBA Service Monitor solution.

Another issue of conventional solutions is their scalability. Since software agents in the web-based Java applet technique need to reside at each client's origin node, they also have to be managed. Since the web world network has tens of thousands of potential origin nodes, the management effort is staggering. The network traffic caused just by reporting of all these software agents would flood a network and tie up resources.

When measuring the roundtrip response time of a web browser over the Internet using HTTP or HTTPs protocols, what one really measures is the time delay an individual experiences with respect to a request for information over a public (Internet) or private (Intranet) network. From an industry perspective, any response time delay over a reasonable amount of time is equivalent to losing revenue because the attention span of typical web customer is very short. Understanding what an individual's roundtrip experience is over a public or private network is an essential metric for businesses to manage.

Thus, in a practical sense, roundtrip response time is a measure of a customer's satisfaction. A quick roundtrip response time usually entails a positive customer satisfaction but a long response time, typically over eight seconds, leads to customer frustration. When dealing with the Internet, particularly the Word Wide Web (WWW), customers want a quick request and response behavior. A customer makes a simple request for information with a mouse or keyboard and the computing system and network feed a response back to the display. But, in reality, this single request and response behavior is broken up, under the covers, into many discrete requests and responses all of which must complete before the customer's original request gets completed. Therefore, the real roundtrip response time (customer satisfaction) is the aggregate measurement of all the discrete requests and responses that take place on behalf of the customer's original request.

The problem in the IT industry is that most response time monitors measure the individual requests and responses but do not aggregate the time to show an actual, complete customer's experience. They remain separate measurements of each small part of the total experience. This is partially because the aggregation process is a very difficult technology and conventional network monitors do not address measurement of true roundtrip response time by aggregating many discrete request and response components connected with the original request.

What makes this aggregation process so difficult is a lack of correlation and completion in the HTTP and HTTPs protocols. Each additional request and response, generated on behalf of the customer's original request, has no correlation mechanism pointing back to the original customer's request. Moreover, when more than one customer makes a request at the same moment in time, it is difficult to identify which additionally generated request and response is related to which original customer. Further, the HTTP and HTTPs protocols do not indicate when a set of many generated requests and responses for an original request has finally completed. These two problems with the HTTP and HTTPs protocols have prevented IT industry from measuring true roundtrip response time for web browser customers. Most conventional products available, like Web Trends (USA), only compute part of the total roundtrip response time.

Moreover, when the web pages have embedded web objects, such as graphics, JavaScript, Applets, Flash, etc., the task becomes much more complex. Furthermore, when the web pages have additional web pages embedded within, named HTML frames, then the task of measuring true response time is very difficult. When HTML frames are used, existing response time monitors cannot associate the embedded HTML frames with the web page they are contained within and, because of this, response time software measures roundtrip response time for these HTML frames independently. Thus, the true roundtrip response time cannot be calculated correctly with conventional response time monitors and a solution is needed that can associate these HTML frames with the web page they are embedded in so that the true roundtrip response time of web pages with embedded HTML frames can be calculated correctly.

Therefore, there is a need for a simple, improved, generic and highly efficient response time monitor in a public or private network, that aggregates time of a set of generated requests and responses that result from an original request for a web page with embedded HTML frames and that can measure the true roundtrip response time and its components from a single, non-origin measurement point, which is the destination node and not the customer's origin node.

SUMMARY OF THE INVENTION

The foregoing and other objects, features, and advantages of the present invention will be apparent from the following detailed description of the preferred embodiments, which makes reference to several drawing figures.

One preferred embodiment of the present invention is a computer-based method utilizing a single response time monitor, located on a non-origin node of a public or private network, for measuring the total roundtrip response time of a set of requests resulting from an original request having embedded HTML frames. The response time monitor builds a relationship tree for the original request and its embedded HTML frames. For each request from the set of requests resulting from the original request, including requests for the embedded HTML frames, the method uses the response time monitor to detect a start time and end time of each component of the request's roundtrip response time in order to calculate each component's duration. Later, the response time monitor calculates the total roundtrip response time by adding together the duration of all components of the original request and all its additional requests that have the same network address and port number.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
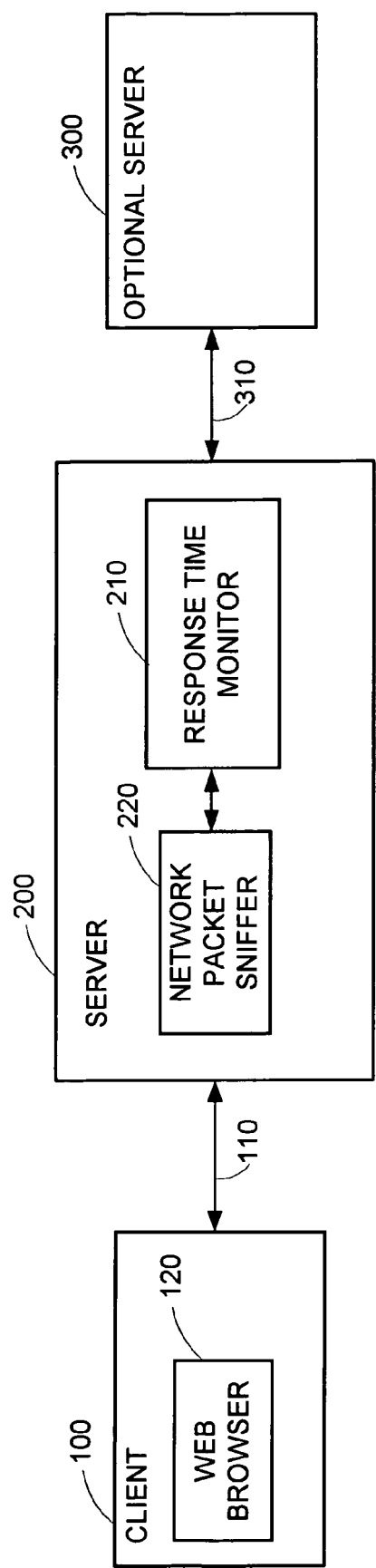
FIG. 1 illustrates a hardware and software network environment enabling efficient measuring of the roundtrip response time, according to the preferred embodiments of the present invention.

In the following description of the preferred embodiments reference is made to the accompanying drawings, which form the part thereof, and in which are shown, by way of illustration, specific embodiments in which the invention may be practiced. It is to be understood that other embodiments may be utilized and structural and functional changes may be made without departing from the scope of the present invention.

The main goal of the present invention is to provide a simple, improved, generic and highly efficient response time monitor in a public or private network that aggregates time of a set of generated requests and responses that result from an original request for a web page with embedded HTML frames and that can measure the true roundtrip response time and its components from a single, non-origin measurement point, which is the destination node and not the customer's origin node. The present invention is preferably used in networks using Hypertext Transfer Protocol (HTTP) or secured Hypertext Transfer Protocol (HTTPs) and Transmission Control Protocol/Internet Protocol (TCP/IP), and the request is compliant with the Hypertext Markup Language (HTML) used for HTML web pages, web services or programs.

General aspects of the present invention disclose a method to measure the true total roundtrip response time in an HTTP or HTTPs protocol environment by a technique that aggregates time of the set of generated requests and responses that result from an original request for a web page with embedded HTML frames that starts at an origin computing node (client), travels over a network to an application program on another computing node (server) and returns back to the origin node with a response. Beside measuring the roundtrip response time, the aspects of the present invention keep track of each component of the roundtrip response time and can show how much time is spent in each component.

The aspects of the present invention use a single response time monitor for measuring a roundtrip response time and its components, including the network time between the origin and destination node. Thus, the roundtrip response time is calculated with only one software agent which is residing at the destination node. This allows the roundtrip response time to be calculated for any destination node using only network protocols. Thus, no software measurement agent needs to be present at the origin node and there is no burden on the customer.

The present invention uses a network packet sniffing set of software that observes the content of HTTP & HTTPs network packets that flow over a public or private network. From the data within these network packets and with some manipulated analysis about the data flow, a correlation technique can be constructed that can relate all generated requests and responses, that occur on behalf of an original request, to that original request. For example, in a web browser environment, an original request and response is created as a by-product of a mouse click on a web page. The response is processed by a computing environment, over a network, with the results being sent back to the web browser. The web browser then examines the returned information and based on its content generates additional requests and responses for information. These additionally generated requests and responses can happen one at a time or all at once or as a combination of both. It is not until all of these generated requests and responses have been processed that the information finally materializes on the customer's display. It is at this moment the customer perceives that the original request has completed. The present invention then measures the aggregate time and not just the individual request and response times, to provide the total roundtrip response time.

When a web page has additional web pages embedded within, named HTML frames, then the present invention associates these HTML frames with the web page they are embedded within so that it can measure the true roundtrip response time. Thus, it observes the relationships between HTML frame web pages and web pages they are embedded within and builds an in-memory relationship tree. This is done so that, at a later time, the entire web page relationship can be known when only a single part of the web page relationship is known. This relationship learning is key to the method of the present invention because once the relationships are learned a roundtrip response time of an HTML frame page can later be discretely measured by connecting it to the web page it is embedded within.

The reason this relationship learning is so important is due to a caching feature of web browsers that makes measuring roundtrip response time of web pages with embedded HTML frames so difficult. Web browsers cache web pages, web objects and HTML frames, which means that they keep a local copy of these items and may have to request a newer web object from the web server. Therefore, if a web page contains many cached HTML frames, the measurement technique may only see current requests for a fraction of the embedded frames. Keeping the relationship tree in memory helps the measurement technique relate one or more fractional requests to the web page that embeds them for later response time aggregation, which allows correct roundtrip response time measurement. As the web browser makes an HTTP or HTTPs request, the web page name is observed by the network packet sniffing technology and that name is compared to the names from the relationship tree. If this name exists in the relationship tree, the name of the web page that embeds this HTML frame becomes an aggregation name. Later, all response times for all HTML frames that resolve to that aggregation name have their response times added together. The response times are observed by their duration and the order they arrived and can be added in serial, parallel or combination mode.

The present invention observes HTTP and HTTPs network flows via the use of a software network packet sniffing technology. During this observation, the first 1,000 bytes of the HTML text is observed and decoded. This portion usually contains information about whether and how the web page is using embedded HTML frames. In this text the relationships between the embedded HTMP frames and the web page are described as part of the HTML language. The relationships are then placed into an in-memory relationship tree.

The TCP/IP address and unique port numbers are available in the protocol header information that flows with the packet.

Each unique TCP/IP address is assumed to be a unique customer in this invention. In reality, it may not always be true because two or more customers may be requesting the same web page, at the same moment in time, and appear to have the same TCP/IP address, which can occur if a proxy server is in use at the customer's location. Because the probability is very small, the present invention treats all customers who share a single TCP/IP address and access the same web page at the same moment in time as a single customer doing many web page accesses.

Once a customer's original request has been identified by its TCP/IP address and port number, the present invention waits for a response with the same TCP/IP and port number. The difference in time is the original request's response time. After that, any new requests that have the same TCP/IP address are assumed to be a continuation of the original request and response. If these additional requests and responses come one after the other, their response times are added together in serial mode. If these additional requests and responses come in parallel at the same time then their largest response time is used. If they come in a mixture of serial and parallel fetches, then a combination of the two computation techniques is used.

Original request and response and all generated requests and responses from its set are said to be completed when one of two conditions is detected. When a request from the same TCP/IP address is detected with a protocol indicating that it is a web page and not a web page object a completion occurs. A web page object is any component of a web page that gives it its personality. For example, an original request for important data may return important data but it also may return information about how to display that data or it may return a picture to help understand that data. Therefore, a customer's request for a web page is not really satisfied until all the web page objects are delivered. Some objects are delivered one after the other while others are delivered at the same time. Another way to detect completion of an original request or response and all its generated requests and responses is based on inactivity. If no more additionally generated requests or responses are detected for some period of time it is assumed that there is no more coming. When one of these conditions is detected, the time measurement for this particular original request and response and all its additionally generated requests and responses is defined as completed. The aggregated response time calculation that is computed for this request is defined as being the true roundtrip response time.

FIG. 1 illustrates a hardware and software network environment enabling efficient calculation of roundtrip response time, according to the preferred embodiments of the present invention. The system uses the algorithm for the roundtrip time calculation shown in the flowchart of FIG. 2. In a block diagram of FIG. 1 a customer at an origin node, named client node 100, interacts with an application on a non-origin node, named server node 200, via a network 110, preferably using a web browser 120. Network 110 is usually the Internet, using the Transmission Control Protocol/Internet Protocol (TCP/IP), which is the packet switching protocol over the Internet. Client node 100 may be a desktop or laptop computer, personal digital assistant (PDA), onboard vehicle computer, cellular phone, etc, which sends its request, such as a request for a web site, either under the Hypertext Transfer Protocol (HTTP) or under the secured Hypertext Transfer Protocol (HTTPs), to an Internet Service Provider (ISP), not shown. ISP establishes a link to the Internet which then passes the request to a content server, not shown, which forwards the request to a content provider, not shown, typically addressed by Uniform Resource Locator (URL) name.

A customer at the client node 100, using a commercial web browser 120, makes a web request by selecting a web page link or by entering a web address on the web browser's address line. This in turn causes an HTTP or HTTPs request to exit the client node 100 and travel over the network 110 to the server node 200 that preferably resides on the World Wide Web The response from the content server node 200 is routed back to the client node 100 and is typically compliant with the Hypertext Markup Language (HTML), that is the standard language for creating documents on the WWW HTML defines the structure and layout of a web document by using a variety of tag commands inserted in the document to specify how a portion or the whole document should be formatted.

A response time monitor 210 of the system aspect of the present invention is connected to a commercial network packet sniffer 220, as illustrated in FIG. 1. This combination operates as an advanced TCP/IP packet sniffing set of software technology which has the ability to measure the response time of an inbound or outbound packet, as seen by a software packet sniffer on a destination node, and can calculate how long a packet took to travel from the origin node and back. For example, if the client node 100 sends a network packet to the server node 200, the response time monitor 210, located on the server 200, can calculate the time from the moment the packet left the client node 100 and arrived at the server node 200. In addition, the response time monitor 210 can measure the time from the moment when a packet leaves the server node 200 for another, optional computing server node 300. Thus, a single measurement software agent located on the server 200, the response time monitor 210, can calculate the time from the client node 100 to server node 200, time on server node 200, time from server node 200 to server 300, and time back to the client node 100, regardless of what protocol is being used by a TCP/IP network.

Figure 2:
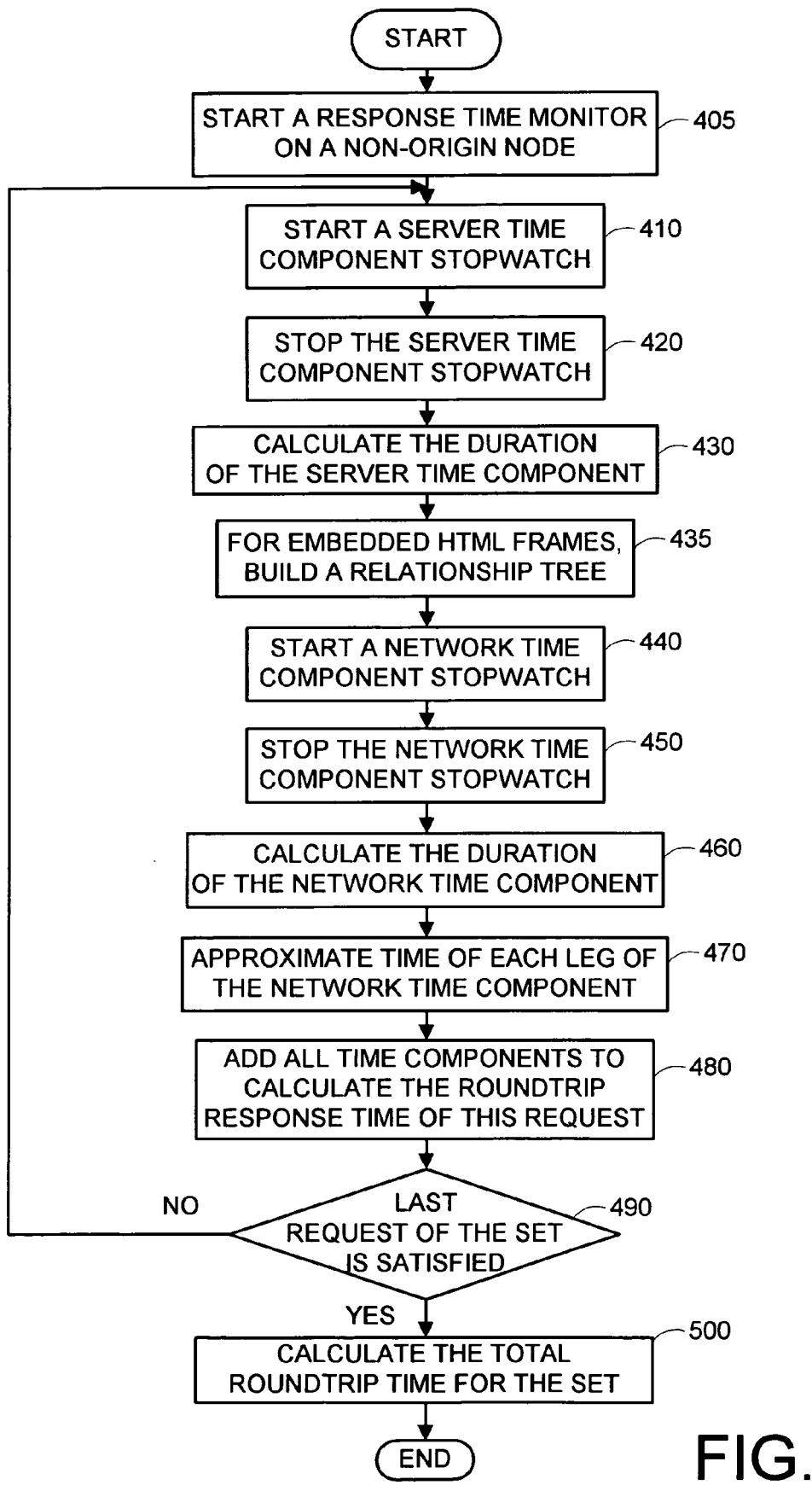
FIG. 2 illustrates a top level flowchart of the measuring of the roundtrip response time, according to the preferred embodiments of the present invention.

Algorithm for an exemplary procedure for calculation of the roundtrip time is illustrated by the flowchart of FIG. 2. In the preferred method aspect of the present invention, a user of the client node 100, illustrated in FIG. 1, makes a request which travels on network 110 to server node 200. Response time monitor 210 is started in step 405 of FIG. 2 and it gets information about this inbound HTTP/HTTPs request from the commercial network packet sniffer 220 which is always running and watches packets which transverse the network 110. In step 410 of FIG. 2, response time monitor 210 sets a software stopwatch which indicates the starting point of time the request will be spending on server node 200 (start time). Right before the response to the request, the HTML page, is placed on the network 110, to be returned to client node 100, the response time monitor 210 is informed of it by the network packet sniffer 220. When it is ascertained that it matches an original request with the same TCP/IP address and port number, the software stopwatch for this request is stopped and end time is recorded in step 420 of FIG. 2. The duration of the time component the request spent on the server node 200 is calculated in step 430 as the time between the start time and end time.

Additionally, in step 435, response time monitor 210 determines whether the web page is an HTML web page by checking the MIME TYPE of the request. If it determines that this is an HTML web page, then it analyzes the HTML to determine whether it contains references (language tags) to embedded frames. If a language tag is found, an in-memory queue is created for the web page, in step 435, which will contain names and response times of all its embedded frames. Thus, the response time monitor will be building a relationship tree for the original request's web page and its embedded HTML frames in this in-memory queue, not shown. The queue is indexed by the web page name and embedded frame names. Each time components' duration, calculated in step 430, is then assigned to the corresponding queue frame page. Thus, the response time is calculated independently for each embedded frame page, but, because the queue structure makes it related to the web page, this time will be included in the total roundtrip response time of the web page.

In other aspects of the present invention, this time may also include the time spent on other server nodes, such as server node 300, and a network 310 between the server node 200 and server node 300, since the server node 200 may have called server node 300 for additional information.

However, in the aspects of the present invention the response time monitor 210 is not able to see when the originating transaction actually started at the client node 100. Thus, the present invention uses a technique that approximates the time of origin of a network packet when the actual observation of that packet's time is not feasible. Moreover, the present invention uses the TCP/IP addresses and port numbers to identify the owner of a measured transaction. In this way, response time measurements are made on a transaction-by-transaction basis, for each user, and are not just an average of transaction times of previous users. Other aspects of the present invention use protocol analysis logic that watches for protocol handshakes as well as for session establishment, change direction and session destruction protocols.

For the approximation of a network time component duration, once the response is placed on network 110, another software stopwatch is started by the response time monitor 210 in step 440 of FIG. 2. The response travels over network 110 to client node 100, which returns an acknowledgement to server node 200, detected by the response time monitor 210 which stops the stopwatch in step 450. The duration of this network time component is calculated in step 460. It reflects the roundtrip time the response spent on the network 110, in both directions, between an origin and non-origin node.

Then, in step 470, the aspects of the present invention divide the network time component in two, to produce an approximate time spent on each leg of network time, inbound and outbound of the non-origin node 200. This approximation can be made since the inbound traffic size of the original inbound HTTP/HTTPs request or acknowledgement is usually much smaller than the outbound traffic size of the response. Thus, instead of getting the actual measurement of the original inbound request time, which is impossible to know when the response time monitor 210 is located in the server node 200, the present invention approximates the network time of the original inbound request time with the acknowledgement time, which is typically small and of similar size. This approximation of the present invention has proven to average out correctly when performed over large number of measurements. Next, the roundtrip time of the original HTML request is calculated in step 480 by the response time monitor 210, which adds all time components of the request.

When the server node 200 returns the HTML page back to the web browser 120, the HTML page contains the text that tells the web browser 120 how to render the web page. HTML page also contains tags that tell the web browser 120 to go fetch more content from the server node 200. This additional fetching of content takes time and must be accounted for in the calculations of the total roundtrip time. In some cases these additional fetches happen in serial mode, one after the other, and sometimes they happen in parallel, at the same time. When they happen in serial mode, their times must be added to the time it took to get the HTML page in order to obtain the correct response time measurement. When they happen in parallel mode, the longest time component needs to be added to the time it took to get the HTML page to obtain the correct response time measurement. Furthermore, sometimes they happen both in serial and parallel mode and a combination of both techniques is required. Only when all the additional fetched content is returned to the client node 100 the web page is considered complete and the roundtrip response time of the original request can be correctly computed. Some of the calculated times may be the response times of embedded frame pages. Thus, in step 490, a test is performed to see whether the last response for the set corresponding to the original request has been received. If so, the method proceeds to step 500.

If not, for each individual fetch of additional content the same measurement technique of FIG. 2 is performed for each request from the client node 100 which produces a unique result. Therefore, it is very normal for a returned content of a single web page to cause many more requests' measurements to take place, due to their embedded content that must be fetched before the page is considered rendered and complete, and thus steps 410-480 of FIG. 2 may be repeated many times.

Each time a request comes from client 100 it is looked at by the response time monitor 210 to see if it is an HTTP/HTTPs request for an HTML page, which is detected by checking the request MIME TYPE tag. If the MIME TYPE reflects that some sort of HTML page is to be returned to client node 100, that request is considered to be a new original request and it is queued in another in-memory queue or table, not shown, indexed by the network address and port number of the requester's client node and its time is excluded. Any new request from the same network address that does not have a MIME TYPE that reflects an HTML page is considered as an embedded content being fetched and is considered part of the HTML page's total response time. If the embedded content reflects an embedded frame page it too is included and measured. As the time components of these embedded requests are measured, they are queued with the corresponding HTML original request already queued. This process continues until one of two events occurs: a new request with a MIME TYPE tag that reflects that a new HTML request is being made, or some period of time goes by with no requests at all.

If a new request comes in with MIME TYPE showing HTML page, it is assumed that the customer at client node 100 made a new web page request and that the original request is satisfied. If time goes by with no requests from client node 100 then an assumption is made that the original request is satisfied and done with and the customer has moved on to something else.

Either way, the original request is considered complete and its total composite roundtrip response time has to be calculated by the response time monitor 210. For this purpose the response time monitor 210 searches for the original HTML request in the in-memory queue. When found, all embedded requests queued to this original HTML request are looked for and their time is added to the original HTML request. Total network time component is calculated separately and then the total server 200 time component is calculated separately. By looking at the timestamp of each component it can be figured out whether they are serial mode fetches or parallel mode fetches and the duration of each component is used in a proper fashion, as described above. At the end, when every element of the set belonging to the original request in the queue is looked at, the total roundtrip time of the original HTML request is calculated in step 500 by the response time monitor 210, which adds all time components of all requests and responses from the set to calculate the total roundtrip response time for the original request.

For performance reasons, network components, such as routers, break up each request and response to make them easier to deal with. Thus, each request large in size will be broken up into N packets sent over the network. The commercial packet sniffer 220 sees each of these network packets and the response time monitor 210 keeps track of each packet and calculates its components' time, according to the flowchart of FIG. 2. For example, a request of size 10,000 may be broken up into 10 request packets of size 1,000, and the response time monitor 210 will set software stopwatches for each of these 10 request packets and measure their unique request and response component duration time. After an acknowledgement is received, the response time monitor 210 will add them together to calculate the total roundtrip response time of the original request of size 10,000, including all requests and responses. Therefore, the response time monitor 210 of the present invention can measure the response time of any request and response network protocol, and takes into account all the request packets separately, when created during network transfer, before totaling their components' times to obtain the roundtrip response time.

Moreover, the uniqueness of this aspect of the present invention is its ability to include the request and response time spent on server 300 and network 310, using the same technique as utilized between the client 100 and server 200. With the present invention a corporation can place a single software measurement agent at their server node and measure the roundtrip response time of the thousands of customers that access their server node without any intrusion or software deployment on any of the customers' computers.

The present invention can be realized in hardware, firmware or software, any combination of hardware, firmware and software, or in any other process capable of providing the disclosed functionality. Implementation of the method of the present invention can be realized in a centralized fashion in one server computer system, or in a distributed fashion where different elements are spread across several interconnected computer systems. Any type of computer system or apparatus adapted for carrying out the methods described herein is suited to perform the functions described herein. FIG. 1 illustrates general purpose computer systems with a group of computer programs which, when being loaded and executed, control the computer system in such a way that it carries out the method aspects of the present invention. In the exemplary environment of FIG. 1, a computer system of the server node 200 is comprised of one or more processors, not shown, which may be connected to memory, not shown, and one or more electronic storage devices, not shown, such as disk drives.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method utilizing a single response time monitor, located on a non-origin node of a public or private network, for measuring a total roundtrip response time of a set of requests resulting from a response, having embedded HTML frames, to an original request, comprising:

(a) utilizing the response time monitor on the non-origin node for building a relationship tree for the original request and the embedded HTML frames;

(b) for the original request and each additional request from the set of requests resulting from the original request, including requests for the embedded HTML frames, using the response time monitor to detect a start time and end time of each component of the request's roundtrip response time in order to calculate each said component's duration;

(c) detecting that the original request and the set of requests resulting from the original request have been completed upon the occurrence of a termination condition; and (d) calculating, by the response time monitor, the total roundtrip response time, including time needed for obtaining the embedded HTML frames, by using the relationship tree to aggregate respective round trip times of the original request and all the additional requests by adding together the duration of all their respective components.

2. The method according to claim 1, wherein the components have the same network address and port number as the original request.

3. The method according to claim 1, wherein the termination condition is the first to occur in time of a subsequent request for an HTML page and no additional requests being detected by the response time monitor for a predefined time period.

4. The method according to claim 1, wherein calculating the total roundtrip response time comprises aggregating the times of the original request and all the additional requests in serial mode, parallel mode or in a combination of the serial and parallel modes.

5. The method according to claim 1, wherein the network is using Hypertext Transfer Protocol (HTTP) or secured Hypertext Transfer Protocol (HTTPs) and Transmission Control Protocol/Internet Protocol (TCP/IP), and the request is compliant with the Hypertext Markup Language (HTML) request.

6. The method according to claim 1, wherein the response time monitor calculates the duration of each packet component of the original or additional request, or its response packet component separately, when the request or response is broken into packets during the network transfer.

7. The method according to claim 1, wherein the components of the roundtrip response time comprise a network time component, calculated as a time between an origin and the non-origin node, and a non-origin node time component.

8. The method according to claim 7, wherein the network time component:

includes an inbound network time of the original or additional request from an origin node to the non-origin node and an outbound network time returning a response back to the origin node, and is calculated as a duration of the outbound network time component returning the response from the non-origin node back to the origin node and a duration of an acknowledgement from the origin node being received by the non-origin node.

9. The method according to claim 8, wherein the non-origin node comprises a first non-origin node using data from a second non-origin node, and wherein a duration of the roundtrip time component spent solely on the first non-origin node is calculated by subtracting from the non-origin node time a duration spent in the second non-origin node and a network time between the first and second non-origin nodes.

10. A method utilizing a single response time monitor, located on a non-origin node of a public or private network, for determining a total roundtrip response time to an origin node for a web page having embedded HTML frames, the method comprising:

(a) receiving a first web page request from an origin node;

(b) sending a response for the web page request, wherein the response has at least one embedded HTML frame;

(c) receiving from the origin node at least one HTML frame request corresponding to the at least one embedded HTML frame;

(d) sending a response for the at least one HTML frame request;

(e) utilizing the response time monitor to build a relationship tree that associates the web page request and the at least one HTML frame request;

(f) for the web page request and the at least one HTML frame request, using the response time monitor to detect a start time and end time of each component of a roundtrip response time of the respective request in order to calculate a duration for each of the components;

(g) calculating and storing, by the response time monitor, roundtrip response times for the web page request and for the at least one HTML frame request by adding together the respective durations of all their respective components;

(h) associating the stored roundtrip response times with the web page request and the at least one HTML frame request as represented in the relationship tree;

(i) receiving a second request related to the first web page request;

(j) sending a response to the second request, the second request corresponding to one of the requests represented in the relationship tree;

(k) calculating, by the response time monitor, a roundtrip response time for the second request;

(l) calculating, by the response time monitor, an associated response time for the second request, where the associated response time is the sum of the stored roundtrip response times associated with the relationship tree, except the stored roundtrip response time associated with the second request; and (m) calculating, by the response time monitor, a total roundtrip response time for the second request by adding the roundtrip response time for the second request to the associated response time for the second request.

11. The method according to claim 10, wherein the components have the same network address and port number as the original request.

12. The method according to claim 10, further comprising for the first web page request and each said HTML frame request, detecting that the respective request has been completed upon the occurrence of a termination condition, wherein the termination condition is the first to occur in time of a subsequent request for an HTML page and no additional requests being detected by the response time monitor for a predefined time period.

13. The method according to claim 10, wherein calculating the roundtrip response time comprises aggregating the times of requests in serial mode, parallel mode or in a combination of the serial and parallel modes.

14. The method according to claim 10, wherein the network is using Hypertext Transfer Protocol (HTTP) or secured Hypertext Transfer Protocol (HTTPs) and Transmission Control Protocol/Internet Protocol (TCP/IP), and the request is compliant with the Hypertext Markup Language (HTML) request.

15. The method according to claim 10, wherein the response time monitor calculates the duration of each packet component of the web page request or additional request, or its response packet component separately, when the request or response is broken into packets during the network transfer.

16. The method according to claim 10, wherein the components of the roundtrip response time comprise a network time component, calculated as a time between an origin node and the non-origin node, and a non-origin node time component.

17. The method according to claim 16, wherein the network time component:
  includes an inbound network time of the web page or frame request from the origin node to the non-origin node and an outbound network time returning a response back to the origin node, and
  is calculated as a duration of the outbound network time component returning the response from the non-origin node back to the origin node and a duration of an acknowledgement from the origin node being received by the non-origin node.

18. The method according to claim 17, wherein the non-origin node comprises a first non-origin node using data from a second non-origin node, and wherein a duration of the roundtrip time component spent solely on the first non-origin node is calculated by subtracting from the non-origin node time a duration spent in the second non-origin node and a network time between the first and second non-origin nodes.

* * * * *